Dec. 15, 1970  P. J. LIAUTAUD  3,546,735
SPECTACLE HINGE PIN
Filed March 13, 1967
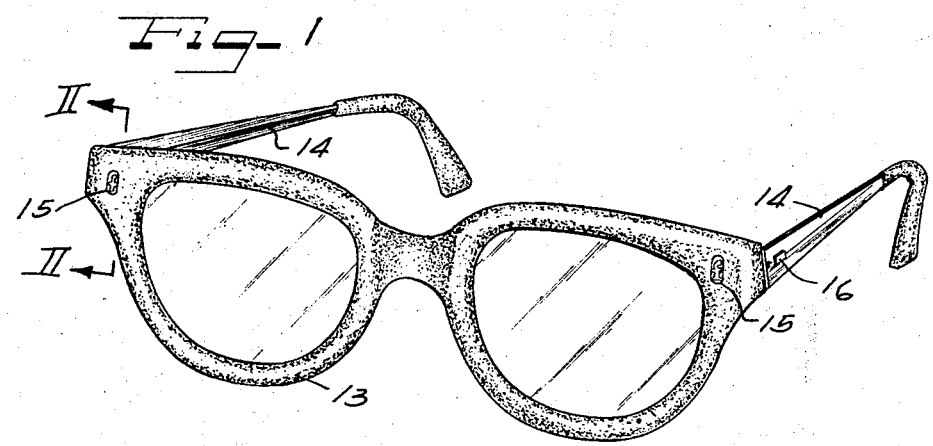
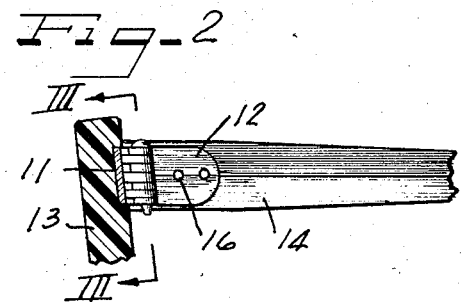
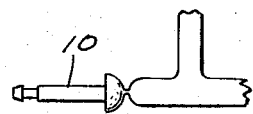
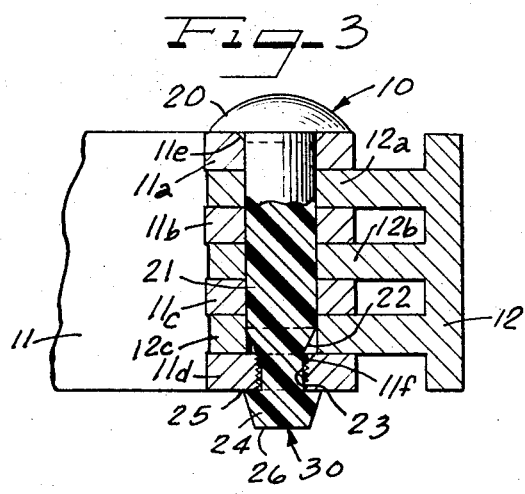
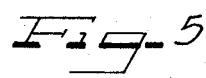
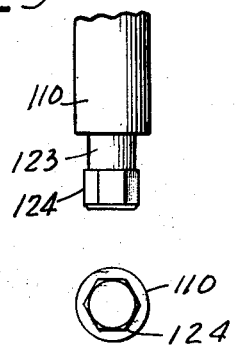
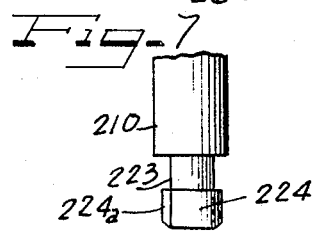
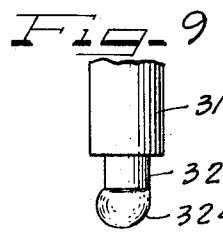
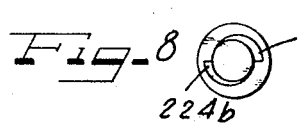
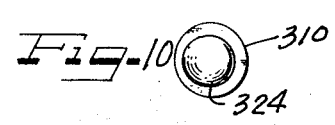
INVENTOR.
PHILIP J. LIAUTAUD
BY
ATTORNEYS

United States Patent Office 3,546,735
Patented Dec. 15, 1970

3,546,735
SPECTACLE HINGE PIN
Philip J. Liautaud, Hoffman Estates, Ill., assignor to The Fendall Company, Chicago, Ill., a corporation of Illinois
Filed Mar. 13, 1967, Ser. No. 622,568
Int. Cl. E05d 5/10
U.S. Cl. 16—128                                          9 Claims

ABSTRACT OF THE DISCLOSURE

A hinge pin constructed of solid molded plastic for assembly with conventional spectacle temple-to-frame hinges. A plastic hinge pin is provided with a shank having a pivotal fin with respect to the hinge plate pivot apertures and integral yieldable means to retain it in position therein. One form provides a reduced diameter neck portion for fit within the conventional threaded retaining portion of one of the hingle plates and an enlarged terminal portion providing a substantial interference fit with the threaded portion and capable of passage through the threaded portion upon the application of substantial axial force. In assembled condition the pin can be withdrawn only by the application of an axial force, rotation of the hinge plate relative to one another having no disassembly tendencies.

BACKGROUND OF THE INVENTION

Spectacle frames have traditionally been manufactured with a main frame portion containing lenses, and two attached temples. In conventional practice the temples are pivotally secured to the main frame by way of hinges. The hinge base plates are respectively secured to the main frame and temple and a generally vertically disposed hinge pin is secured in aligned pivot apertures in the hinge barrels. A chronic problem in the art has resulted from the fact that conventional hinge pins have been threaded and that due to the oscillating of the temple relative to the frame, the pins have a tendency to loosen and become lost. This invention relates to the field of pin constructions having means preventing such accidental disassembly and loss.

To applicant's knowledge, the prior art in the field of accidental loss prevention hinge pins relates to means for riveting or peening over the hinge pin or screw, providing a split spring metal hinge pin mechanically collapsible to permit assembly or providing a split spring metal hinge barrel cooperable with an enlarged detent means on the pin. Examples of prior patented art include United States Letters Patent to Czudak No. 2,947,024 issued in Class 16, Sub-class 158 and Urich No. 3,110,057 issued in Class 16, Sub-class 142. The prior art does not include, to applicant's knowledge, a spectacle hinge pin inherently deformable under the application of high stress wherein the deformation occurs in a solid pin configuration. Accordingly, to applicant's knowledge, no prior pin configuration has been employed wherein no machining steps are applied to the pin in its manufacture and in which no special configuration is required for the hinge, so that the hinge pin of the present invention is completely compatible with and interchangeable with conventional hinge pivot screws.

SUMMARY OF THE INVENTION

As a result of extensive experimentation, I have discovered that molded plastic materials such as the self-lubricating Nylon, a high molecular weight polyamide, manufactured by E. I. du Pont de Nemours & Co., Teflon, a polytetrafluoroethylene, manufactured by E. I. du Pont de Nemours & Co., and the like, are extremely tough and are semiresilient. They may, in their molded form, be deflected and, more particularly, deformed under pressure, and at the same time will return to their original molded configuration after the removal of the deformation pressure to provide a substantially rigid pin. I have machined hinge pivots constructed of such materials in the manner employed in the manufacture of hinge pins constructed in steel or other metals. However, I have discovered in the manufacture and testing of hinge pin configurations for spectacles, that the construction of hinge pins of plastic material in the manner above described provides a pin which is subject to failure and in which the self-lubricating features of the best-formed unmachined surface are partially lost and additionally the cost of successfully machining such a part is excessively expensive. The machining of the plastic material provides small and localized high stressed areas at which the plastic fatigues and fails. Similarly, the provision of slotted or otherwise collapsible pins results in a pin far too flexible to stay in position and subject to failure.

Accordingly, I have provided a one-piece molded pin in an unmachined and unrelieved (unslotted) structural condition but which is constructed of a semiresilient yielding plastic material having a high surface strength and self-lubricating action in the molded, unmachined, condition. The pin may be molded to co-operate with a conventional threaded screw hole but without torsional stress, and, accordingly, can be used with all standard spectacle hinges and may readily be replaced for such in the field or at the factory.

It is, accordingly, an object of the invention to provide a reliable, efficient hinge pin for securely pivotally connecting a pair of spectacle hinge base plates without the need for torsional stress on the hinge pin and in a manner preventing ready disassembly of the hinge.

Another object of the invention is to provide a novel hinge pin of extremely inexpensive construction having an absolute minimum of machining costs without sacrificing significant performance.

Still a further object of the invention is to provide a solid hinge pin capable of securely fastening a pair of hinge plates without threads.

BRIEF DESCRIPTION OF THE DRAWINGS

Several embodiments of the invention are shown in the drawings.

FIG. 1 is an isometric view of a spectacle assembly;

FIG. 2 is a cross-sectional, side-elevational view taken along the line II—II of FIG. 1;

FIG. 3 is a substantially enlarged cross-sectional view of the hinge assembly taken along the line III—III of FIG. 2;

FIG. 4 is a plan view of a molded hinge pin with its plastic sprue and runner portions still secured thereto and illustrating the manufacture of the pin;

FIG. 5 is a modified form of pin, shown in elevation and partially broken away;

FIG. 6 is an end-elevational view of the modified form of pin shown in FIG. 5;

FIG. 7 is a further modified form, shown in elevation and partially broken away, of a pin constructed in accordance with the present invention;

FIG. 8 is an end-elevational view of the modified form of pin shown in FIG. 7;

FIG. 9 is still a further embodiment of the invention shown in elevation, partially broken away, and FIG. 10 is an end-elevational view of the embodiment of the invention shown in FIG. 9.

DESCRIPTION OF THE PREFERRED EMBODIMENT

As can be seen from a consideration of FIGS. 1 through 4, a preferred embodiment of the invention comprises a hinge pin generally indicated at 10 securing hinge plates 11 and 12 attached respectively to the main spectacle frame 13 and spectacle temples 14. The hinge plates 11 and 12 are conventional and may be secured, as is known in the art, to the frame and temple by means of rivet plates 15 and 16, respectively.

The hinge pin 10 comprises an enlarged head portion 20, a generally cylindrical shank portion 21 which tapers at 22 to a reduced neck portion 23, and an enlarged retaining portion 24 at the lower terminal end of the pin. The assembly of the pin in the hinge base plates 11 and 12 is readily seen in FIG. 3. There, the hinge plate 11 is provided with hinge barrels or leaves 11a, 11b, 11c and 11d, while hinge plate 12 is provided with leaves 12a, 12b, and 12c, meshing therewith. The uppermost leaf 11a is provided wtih a counterbore 11e for the acceptance of a conventional screw type hinge pin. The counterbore 11e forms no part of the present invention and need not be employed with the pin of the present invention. Similarly, the lowermost half 11d of the plate 11 is provided with an aperture 11f having a conventional thread for co-operation with the standard hinge pin. It will be realized, of course, that the dimensions of the components above described are conventionally very small. For example, in a typical spectacle frame of a heavy duty type, the diameter of the shank 21 would comprise approximately .040 inch to provide a snug fit in apertures slightly larger in the leaves of plates 11 and 12. With a shank diameter on the order of .040 inch, as above noted, a conventional diameter of the threaded hole 11f would comprise .038 inch to approximately .039 inch internal diameter. A neck dimension for the neck portion 23 of .035 inch, providing a loose fit within the tapped hole 11f has proven very satisfactory and a maximum dimension at the corner 25 of the portion 24 of .040 inch has proven satisfactory. It will be observed that with this relationship an interference fit of approximately .0015 inch to .002 inch is provided between the maximum restraining diameter at 25 and the inside diameter of the threaded hole 23. The tapered guide end 26 of the pin may, of course, be substantially smaller than the threaded diameter of the hole in order to permit easy one-way assembly of the pin into the hinge.

As explained above, I have found that by molding the pin 10 in its final dimension, in the manner illustrated in FIG. 4, the pin is completely ready for installation and a superior retaining device is provided. I have found that by employing semirigid plastic materials of the type having an inherent surface self-lubricating quality when molded, an extremely strong and exceptionally efficient hinge pin is achieved. Satisfactory plastic materials include the polyolefins, for example polyethylene and polypropylene and the halogenated $C_2C_3$ olefins such as tetrafluoroethylene commonly marketed by E. I. du Pont de Nemours & Co. under the trademark Teflon, vinyl chloride and vinylidine chloride, the high molecular weight polyamides, commonly marketed by E. I. du Pont de Nemours & Co. under the trademark Nylon, and acetal resins commonly designated as a polyoxymethylene marketed by E. I. du Pont de Nemours & Co. under the trademark Delrin. These products provide, when molded or extruded, a surface that upon cooling from the molten condition assume a surface molecular alignment and density providing a self-lubricating characteristic of extreme toughness. I have found that pins of the present invention constructed from Nylon, for example, are extremely strong and are capable of deforming to accommodate an interference fit on the order of .002 inch on the diameter, as above described and satisfactorily snap through the threaded aperture into the assembled position of FIG. 3. I have found that with the interference fit of approximately .002 inch or less with a co-operating snap fit threaded aperture on the order of .040 inch internal diameter, the pin will be positively retained against all manner of dislodging forces, except a powerful force application directly applied in the direction of arrow 30.

A consideration of the structure shown in FIG. 3 clearly demonstrates that the provision of the head portion 20 is not essential to satisfactory operation of the embodiment there illustrated and it may, accordingly, be omitted. This is true since the lowermost hinge leaf 11d has, in the embodiment illustrated, a threaded internal diameter which is less than the diameter of the shank 21 of the pin. This results in a condition in which the leaf 11d provides an axially positioning means preventing movement of the pin 10 in either direction away from its assembled relationship. However, provision of the head 20 provides a compressive effect tending to maintain the hinge tight. This latter effect may be achieved by providing a dimension between the edge 25 and the head 20 the same or slightly less than the unstressed outside dimension of the hinge plate 11 so that assembly of the hinge pin will provide a slight compressive effect between the leaves 11a and 11d.

Modified forms of the pin are illustrated in FIGS. 5 through 10. In FIG. 5, a pin 110 is shown with a reduced or necked portion 123 and a hexagonal enlarged end portion 124. The dimensions of the shank 110 and neck portion 123 are identical to the respective dimensions of the shank 21 and the neck 23 of the embodiment shown in FIGS. 1 through 4. By providing a polygonal periphery to the enlargement 124, however, a slightly larger total maximum dimension of the head 124 may be achieved although the head portion 124 is solid the flats or relief portions of the periphery permit deformation upon insertion of the pin past the threads in the leaf 11d. Similarly, in the embodiment shown in FIGS. 7 and 8, the shank 210 and neck portion 223 are identical to their respective parts in FIGS. 3 and 5. The enlarged retaining portion 224, however, is provided by two wings 224a and 224b providing peripheral relief. In the embodiment shown in FIGS. 9 and 10, the shank 310 and neck portion 323 are again standard. The enlarged end portion 324 comprises a bulbous protrusion extending radially away from the axis of the shank 310 in one direction. Upon insertion axially of the pin of the embodiments shown in FIGS. 9 and 10, the portion 324 is deflected laterally toward the axis of the shank 310 and snaps back into its normal position shown in FIG. 9 after assembly.

From a consideration of the above description and drawings, it will be clear that I have provided a semi-resilient plastic hinge pin of solid construction and having extremely high strength and durability. The pin co-operates with conventional hinge plates now used with spectacles and provides a self-lubricating, quiet, unusually long-lived pin that is almost impossible to lose accidentally. The pin may readily be withdrawn through the use of a tool providing an essentially axial force but will not become dislodged through use.

It will be apparent to those skilled in the art that variations may be made in the specific configuration without departing from the scope of the novel concepts of this invention. For example, in the event no threads are provided in the hinge plate and the aligned apertures are all of the same diameter, the enlarged retaining edge 25 and the head 20 may both be constructed with a diameter slightly larger than said apertures to thereby provide a solid plastic pivot pin for such construction. Similarly, other forms of retaining portions 24, 25 may be employed. For example, the portion 24 may take the form of a sphere. As noted above, the preferred construction employs molded unmachined material. However, the thermoplastic materials preferably employed may be heated after machining to provide a heat formed smooth surface of great toughness, substantially similar to the molded, and hence, heat formed, surface preferred. In view of such modifications, and others that will be obvious to those working in the art from the description hereinabove set forth, it is my intention that the scope of the present invention be limited solely by that of the hereinafter appended claims.

I claim as my invention:

1. A hinge pin for use with a pair of hinge plates having interleaved rigid portions with aligned pivot apertures, said pin comprising a generally cylindrical, peripherally solid member of semiresilient plastic having a diameter substantially the same as said pivot apertures, and means on said co-operating with at least one of said hinge plates to retain said pin in assembled position in the pivot apertures, the terminal leaf of one hinge plate being provided with a rigid threaded aperture of an internal diameter smaller than the pivot apertures and said pin having a reduced diameter neck portion adjacent one end thereof for passage through said threaded terminal portion and said one end comprising an enlarged portion with a maximum diameter larger than the internal diameter of said threaded aperture.

2. A structure in accordance with claim 1 wherein the other end of said pin is provided with an enlarged head portion for abutting contact with the terminal leaf of the assembled hinge opposite from said first mentioned terminal leaf.

3. A structure in accordance with claim 1 wherein said one end comprises a generally conical guide portion having its maximum diameter adjacent said neck portion.

4. A structure in accordance with claim 1 wherein said enlarged one end portion has its maximum diameter in a cross-section of polygonal form.

5. A structure in accordance with claim 1 wherein said enlarged one end portion is eccentric to the axis of said pin whereby the enlarged portion will pass under axial force through the threaded aperture only by lateral deflection of the enlarged portion as a whole relative to the axis of said pin.

6. A structure in accordance with claim 1 wherein said enlarged end portion has an irregular outer peripheral surface comprising projections and relieved portions.

7. A srtucture in accordance with claim 1 wherein said pin is molded plastic.

8. A structure in accordance with claim 2 wherein said pin is molded Nylon.

9. A structure in accordance with claim 1 wherein said enlarged one end comprises a bulbous protrusion having its maximum diameter in a cross-section of substantially circular form.

References Cited

UNITED STATES PATENTS

| | | | |
|---|---|---|---|
| 2,947,024 | 8/1960 | Czudak, Jr. | 16—128 |
| 3,349,430 | 10/1967 | Rosenvold et al. | 16—128 |
| 2,828,668 | 4/1958 | De Angelis. | |
| 3,042,961 | 7/1962 | Tieri | 16—168X |
| 3,110,057 | 11/1963 | Urich | 16—169X |

BOBBY R. GAY, Primary Examiner

D. L. TROUTMAN, Assistant Examiner

U.S. Cl. X.R.

16—168